US006980336B2

(12) United States Patent
Joubert et al.

(10) Patent No.: US 6,980,336 B2
(45) Date of Patent: Dec. 27, 2005

(54) SECURED DOCUMENT, SYSTEM FOR MANUFACTURING SAME AND SYSTEM FOR READING THIS DOCUMENT

(75) Inventors: Cécile Joubert, Orsay (FR); Brigitte Loiseaux, Bures S/Yvette (FR); Philippe Robin, Bourg la Reine (FR); Claude Bricot, Villejuif (FR)

(73) Assignee: Thales, Paris (FR)

( * ) Notice: Subject to any disclaimer, the term of this patent is extended or adjusted under 35 U.S.C. 154(b) by 0 days.

(21) Appl. No.: 10/971,136

(22) Filed: Oct. 25, 2004

(65) Prior Publication Data

US 2005/0052716 A1 Mar. 10, 2005

Related U.S. Application Data

(62) Division of application No. 10/019,314, filed as application No. PCT/FR00/01914 on Jul. 4, 2000, now Pat. No. 6,873,443.

(30) Foreign Application Priority Data

Jul. 9, 1999 (FR) ................................. 99 08958

(51) Int. Cl.⁷ .............................................. G03H 1/00
(52) U.S. Cl. ............................................. 359/2; 380/54
(58) Field of Search .................... 359/1, 2; 283/86; 380/54

(56) References Cited

U.S. PATENT DOCUMENTS

| 3,620,590 A | * | 11/1971 | Barker ........................ 380/54 |
| 3,894,756 A | | 7/1975 | Ward |
| 4,140,373 A | * | 2/1979 | Rull ............................ 380/54 |
| 4,171,864 A | | 10/1979 | Jung et al. |
| 4,832,445 A | * | 5/1989 | Haines et al. ................... 359/2 |
| 5,142,383 A | * | 8/1992 | Mallik ........................... 359/2 |
| 5,455,129 A | * | 10/1995 | Bussard ......................... 430/1 |
| 5,483,363 A | | 1/1996 | Holmes et al. |
| 5,658,411 A | * | 8/1997 | Faykish ...................... 156/233 |
| 5,920,058 A | * | 7/1999 | Weber et al. ................. 235/457 |
| 6,337,752 B1 | * | 1/2002 | Heckenkamp et al. .......... 359/2 |

FOREIGN PATENT DOCUMENTS

| EP | 0 283 233 | 9/1988 |
| GB | 2 196 443 | 4/1988 |
| GB | 2 254 166 | 9/1992 |

* cited by examiner

*Primary Examiner*—Mark A. Robinson
*Assistant Examiner*—Alessandro Amari
(74) *Attorney, Agent, or Firm*—Oblon, Spivak, McClelland, Maier & Neustadt, P.C.

(57) ABSTRACT

A document includes at least one drawing or data produced, for example, by printing. In addition, this document includes a hologram representing part of the document. The hologram of this document is recorded using a system including a prerecorded or electrically controllable optical modulator in which the image of at least part of the document is recorded. This modulator is designed to be combined with a layer of photosensitive material. A first reference wave illuminates the layer of photosensitive material. A second wave incident on the modulator and giving rise to a third object wave is also transmitted to the layer of photosensitive material in order to interfere with the reference wave in this layer.

15 Claims, 7 Drawing Sheets

(HP) recording mode

Fig. 11

Use on the card

Fig. 12

SECURED DOCUMENT, SYSTEM FOR MANUFACTURING SAME AND SYSTEM FOR READING THIS DOCUMENT

CROSS-REFERENCE TO RELATED APPLICATIONS

This application is a divisional of U.S. application Ser. No. 10/019,314 now U.S. Pat. No. 6,873,443 which is the National Stage of International Application No. PCT/FR00/01914, filed Jul. 4, 2000, and further is based upon and claims the benefit of priority from the prior French Patent Application No. 99 08958, filed Jul. 9, 1999, the entire contents of each of which are hereby incorporated herein by reference.

BACKGROUND OF THE INVENTION

1. Field of the Invention

The invention relates to a secured document, a process and a system making it possible to manufacture this document and means making it possible to read it.

2. Discussion of the Background

It is now relatively easy for forgers to reproduce conventional documents such as passports, identity card, identification badges.

The object of the invention is to make it difficult, or even virtually impossible, to reproduce and/or falsify such documents.

Securing documents (identity cards, passports, etc.) against counterfeiting and falsification is a fundamental problem which arises with all those involved in the field.

The restrictions which bear on the securing methods-are stringent. This is because these documents must be made with:

- a very low production cost (a few tens of centimes per document)
- a short duration for the process allowed for the manufacture of each document (a few seconds per document)
- a high level of protection against counterfeiting.

Processes for securing documents, for example by hologram, are known from documents U.S. Pat. No. 4,171,864, EP-A-0 283 233, GB-A-2 254 166, U.S. Pat. Nos. 3,894,756 and 5,483,363, but these known processes do not offer strengthened security against counterfeiting.

SUMMARY OF THE INVENTION

Generally, the object of the invention is to produce, on the document to be protected, a characteristic hologram which is difficult to copy and moreover which carries printed data in a conventional manner on the document. Thus a verifying agent will be able to check the document by comparing the content of the hologram with the content of the rest of the document. For example, the hologram represents an image of the identity photo contained on the document. Comparing the image of the hologram with the image of the photo makes it possible to authenticate the document quickly and easily.

The invention therefore relates to a document comprising at least one drawing or data, made by deposition or inclusion of pigments or dyes which can be read optically, and a hologram made from a copy of said drawing or of said data, characterized in that the hologram comprises deformations introduced during its recording which makes the copy read from the drawing or said data different.

The invention also relates to a document security system, comprising a prerecorded or electrically controllable optical modulator in which the image of at least part of the document is recorded, said modulator being designed to be combined with a layer of photosensitive material, at least one first light source making it possible to transmit a first reference wave to the layer of photosensitive material and a second incident wave onto said modulator and giving rise to a third object wave which is transmitted to the layer of photosensitive material in order to interfere with the reference wave in this layer, characterized in that it comprises in the path of the first wave or of the second, means inducing scrambling in the hologram recorded in the layer of photosensitive material.

The invention also relates to a system for reading a document comprising a hologram containing an image of part of said document, said image being scrambled, characterized in that it comprises a device for correcting said scramblings, or revealer, said hologram being readable through the revealer.

BRIEF DESCRIPTION OF THE DRAWINGS

The various objects and characteristics of the invention will become more clearly apparent in the following description given by way of example and in the appended figures which represent:

FIGS. 2 to 4c, examples of hologram recording systems according to the invention;

An example of a document secured according to the invention will first of all be described with reference to FIG. 1a. By way of example, FIG. 1 shows an identity card 1 comprising data 4 indicating the identity of the possessor of the card, his or her photograph 2 and his or her signature 5. Furthermore, according to the invention, the card comprises a hologram 3 in which one or more elements for personalizing the card have, inter alia, been recorded, such as the photograph, the signature, etc. In FIG. 1, the photograph has been chosen for recording in the hologram. A card of this type would thus be more difficult to falsify since the hologram contains data for personalizing the card, which will change from one card to another.

Figure 1A:
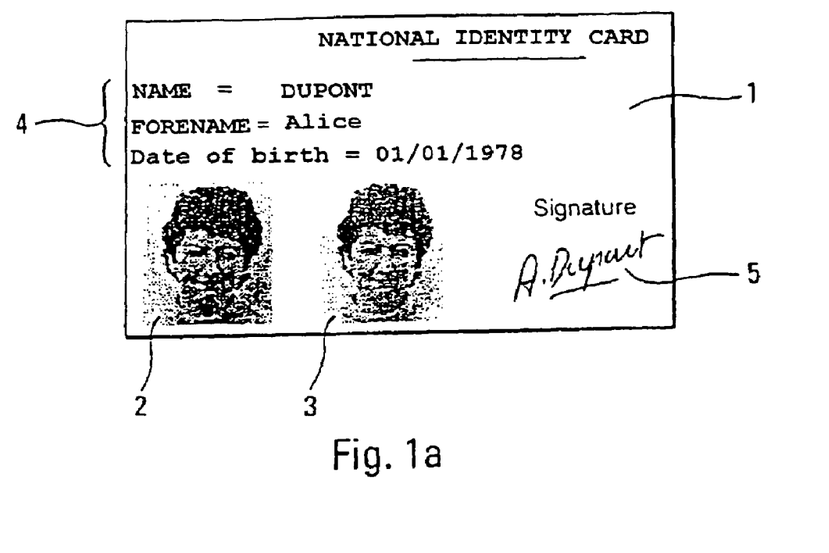
FIGS. 1a and 1b, examples of documents secured according to the invention.
Figure 1B:
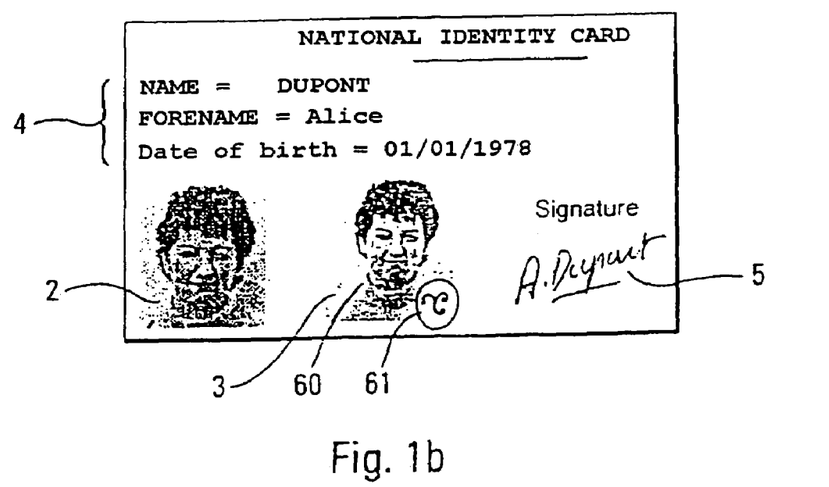

FIG. 1b shows a variant embodiment of FIG. 1a. According to this variant the hologram 3 contains images which appear in different planes. An image 60 may be, for example in the case of an identity card, a copy of the identity photo 2, whilst another image 61 may be either a standard image (logo) or other data from the card such as the copy of the signature 5. According to another variant (not shown), the hologram may also comprise data printed on its surface. A first example of the process of recording the hologram will now be described with reference to FIG. 2.

Figure 2:
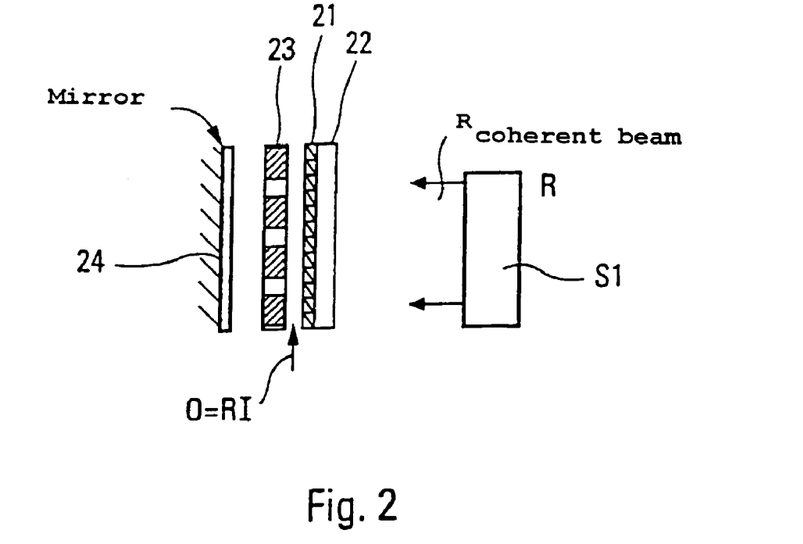

A support element 22 is coated on one of its faces with a layer of photosensitive material 21. An optical modulator 23, such as a transparent photographic support or a controllable modulator such as a liquid-crystal screen, is applied near to or in contact with the layer of photosensitive material.

Preferably, the modulator makes it possible to supply the contents (data or image) of part of the document to be secured. If this involves a prerecorded modulator of the transparency type, this part of the document is recorded in the modulator. If this involves a controllable modulator, the part of the document can be displayed using the control of the modulator.

The support element 22 is transparent at the recording wavelength. A mirror 24 is placed on the side opposite the photosensitive layer with respect to the modulator 23. A light beam R supplied by a source S1 and carrying a coherent wave illuminates the support element 22. By way of example, in FIG. 2, this light beam is perpendicular to the plane of the support element 22 and of the photosensitive layer 21. The beam R passes through the support 22, the holography layer 21. It is modulated by the modulator 23 and is transmitted to the mirror 24. The latter reflects the modulated beam which passes back through the modulator. According to this embodiment, the mirror 24 is perpendicular to the direction of the beam and reflects a beam colinearly with the incident beam. The reflected modulated beam interferes with the beam R in the layer of photosensitive material. The modulation carried by the modulated beam is therefore recorded in the photosensitive layer. Thus, a hologram containing data or an image, which is a copy of data or of an image contained in the document to be secured, has been recorded. If the modulator 23 contains, for example, the photograph of the possessor of the identity card, this photo has therefore been recorded in the hologram.

In this process, it is assumed that T is the transmission coefficient of the modulator and that O is the wave illuminating the hologram on the side opposite the beam R, which we will call reference wave R hereinafter.

The function recorded by the hologram comes from the interference between the reference wave R and the wave $O \sim R^*T$, the object wave from the transparency.

The hologram records $R(R^*T^2)^*$ i.e. $RRT^2$.

If the hologram is thick, it will rediffract on reading the recorded image, for specified angles of incidence (Bragg effect) of the illumination wave and of the viewing direction.

The modulator can integrate a scattering function for improved reading of the hologram and in order to complicate any counterfeiting.

Figure 3:
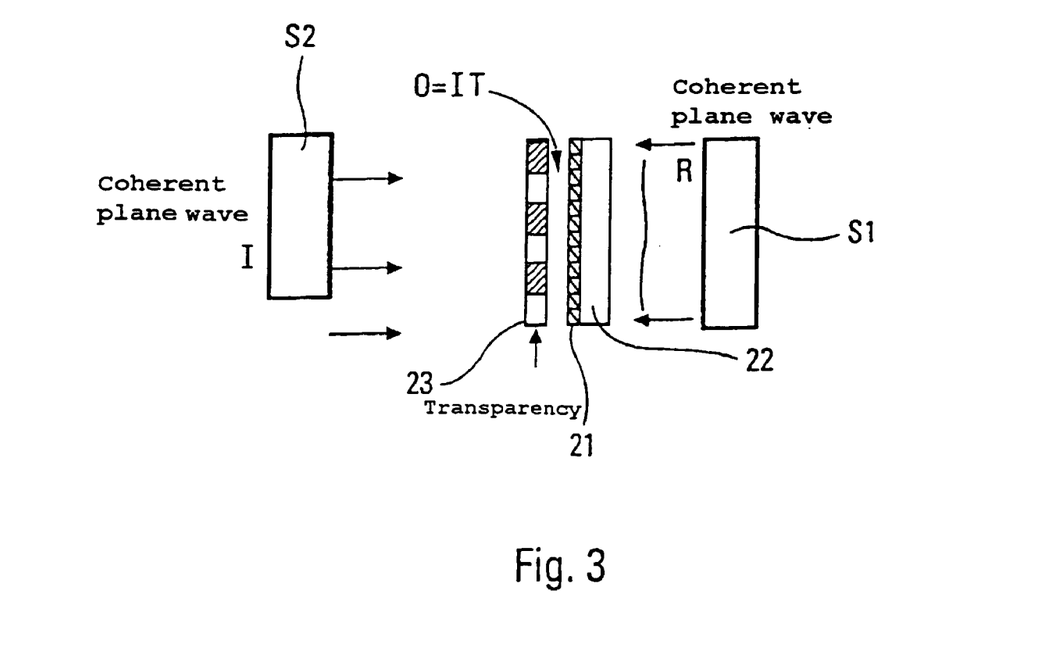

FIG. 3 shows another recording process in which two waves illuminating the photosensitive layer are needed. The light modulator 23 is placed against the layer of photosensitive material 21 borne by the support 22.

An illuminating reference wave R supplied by the source S1 is transmitted to the layer of photosensitive material 21 without passing through the modulator. An illumination wave I supplied by the source S2 illuminates the modulator 23 and is transmitted therethrough to the layer of photosensitive material (illumination wave O, O=IT). The two waves R and O interfere in the photosensitive material 21. Preferably, the two waves O and R are counterpropagating and are perpendicular to the plane of the layer of photosensitive material 21. Also, preferably, the two waves are coherent plane waves.

The function recorded by the hologram comes from interference between R, reference wave, and the object wave coming from the modulator illuminated by the plane wave I:O=IT.

The hologram records $R^* \cdot I.T$.

The thick hologram reilluminated by a plane wave R will diffract an image proportional to IT, that is to say, the image of the transparency, provided that I is of the plane wave type, like R.

As in FIG. 2, the modulator 23 of FIG. 3 can be integrated into a scattering function. For example, a layer of scattering material will be deposited on the face of the modulator located on the side of the layer of photosensitive material.

Figure 4A:
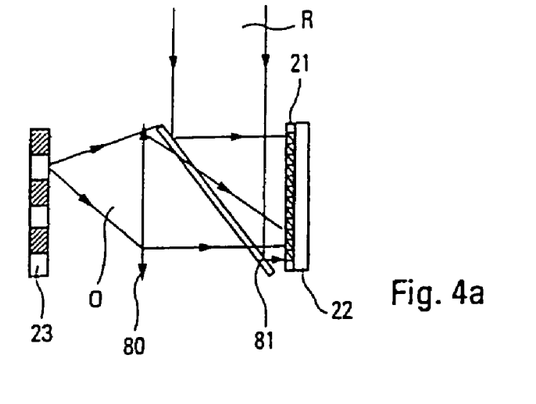

In the above, the recording of the hologram 21 has been carried out by placing thereagainst an optical modulator. It is also possible to design a recording system in which the modulator is illuminated by a wave I, which is modulated by the modulator and which supplies a wave O, as is shown in FIG. 4a. An optical device 80 images the modulator in the plane of the hologram. Moreover, a beam-splitter plate 81 placed in the path of the wave O makes it possible to transmit a reference wave R to the photosensitive medium 21. This reference wave interferes with the wave O and makes it possible to record the image supplied by the modulator 23. The rereading of such a hologram requires placing a mirror against the support 22 on the side opposite the hologram 21.

Figure 4B:
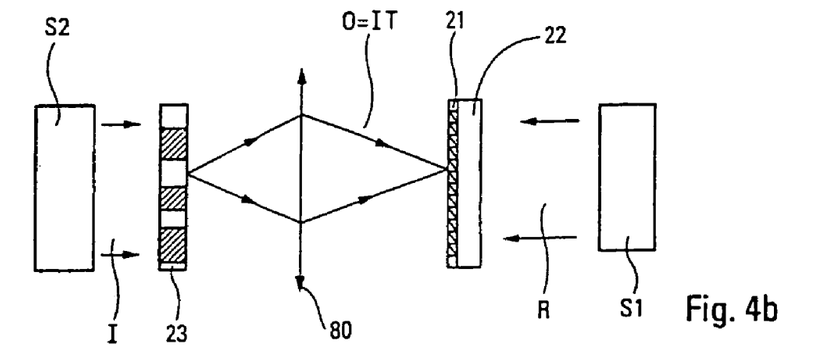
Figure 4C:
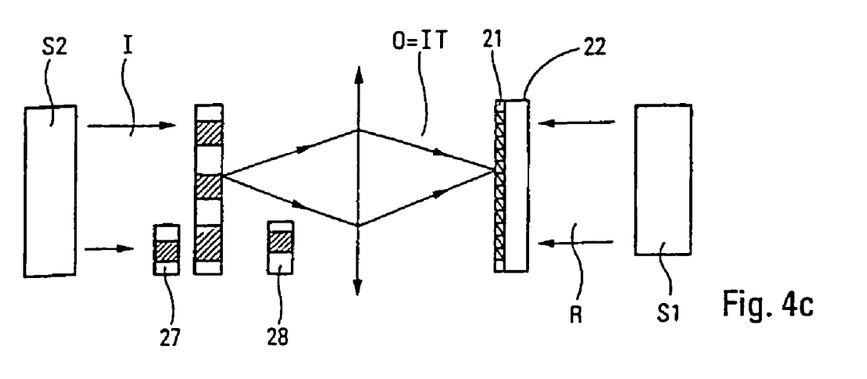

FIGS. 4b and 4c represent variants of recording systems in which the modulator is not placed against the hologram. As can be seen in FIG. 4b, the modulator 23 is illuminated by the wave I and is projected by the optic 80, onto the surface of the layer of photosensitive material 21 (wave O=IT). Moreover, the layer of photosensitive material is illuminated by a reference wave R incident on this layer from the side opposite the modulator. The two waves O and R interfere in the photosensitive layer in order to record a hologram corresponding to the display of the modulator 23. As is known in the prior art, the waves O and R are preferably coherent.

FIG. 4c shows the system of FIG. 4b in which one or more additional light modulators 27, 28 have been provided. These modulators are not placed in the same plane as the modulator 23. These modulators will make it possible to record, in the photosensitive layer of the holograms which will not appear in the same plane as the image of the modulator 23.

Preferably, the images of the various modulators will be recorded separately. The image of the modulator 23 will be recorded when the modulators 27 and 28 are transparent or in the absence of these modulators. In order to record the image of an additional modulator, 27 for example, the modulator 23 will be made transparent (or removed) possibly together with the modulator 28.

It should be noted that the various holograms recorded using the various modulators can be recorded using different wavelengths insofar as the nature of the photosensitive layer 21 allows it. These holograms will then be reread using these various wavelengths.

The variant of FIG. 4c making it possible to record visible holograms in different planes is also applicable to the systems of FIGS. 2 and 3 by also providing one or more additional modulators on the path of one of the waves I or R.

These additional modulators will make it possible to display either a specific motif logo) or data (a signature for example) of the document to be secured.

In order to induce a scattering effect and/or aberrations in the hologram, the means inducing the scattering and/or the aberration can be placed either in the path of the wave O or in the path of the wave R.

Figure 5:
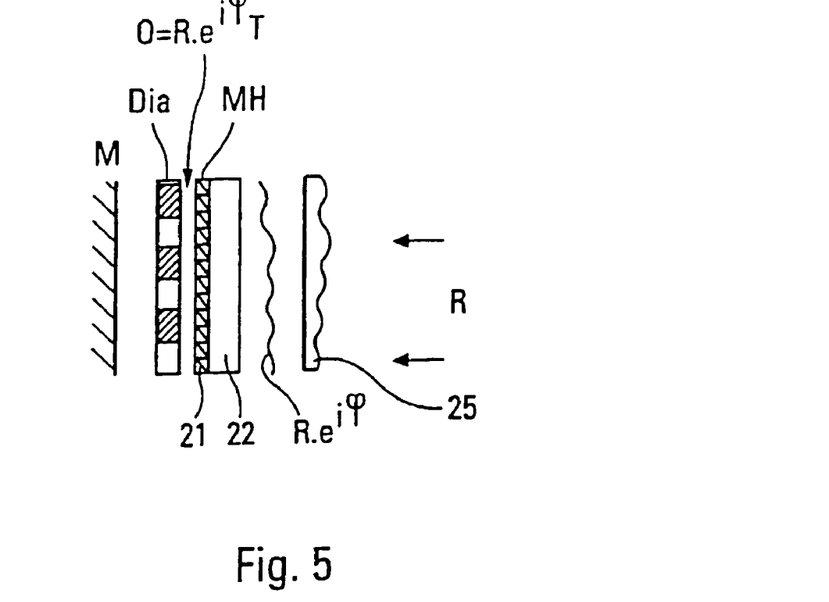
FIGS. 5 and 6, recording systems making it possible to induce scrambling in the images recorded in the holograms.
Figure 6:
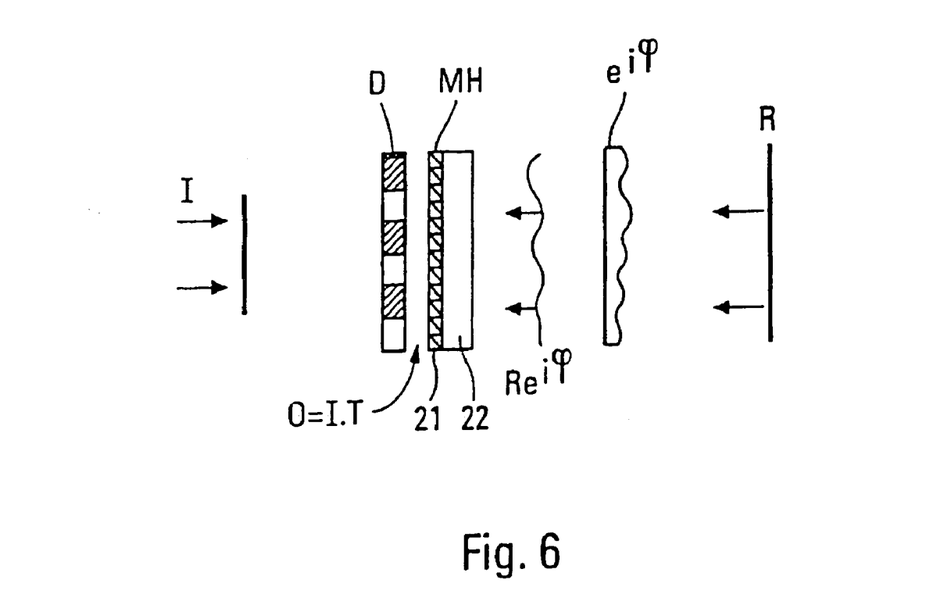

FIGS. 5 and 6 show variants of the systems of FIGS. 2 and 3, respectively, in which optical aberrator devices are provided.

Thus, in FIG. 5, an aberrator 25 is positioned, for example, on the reference wave R. An aberrator introduces a local phase $\phi$ into the wave R, that is to say, it transforms it into $R.e^{i\phi}$.

The modulator is also illuminated by $R.e^{i\phi}$ and the object wave O is $O=R^*.e^{-i\phi}T^2$. The hologram records $R(.R^*e^{i\phi}T^2)^*$, i.e. $RRe^{2i\phi}T^2$.

In reading mode, illuminated by $R^*$, it diffracts a wave $e^{2i\phi}RT^2$ deformed with respect to $RT^2$. The image appears scrambled to the observer. The observer can read normally only a deformed image. The deformation undergone by the image is twice that coming from the aberrator.

If the aberrator 25 is located on the modulator side with respect to the layer of photosensitive material, the hologram records $R^*.R.T^2 \, e^{2i\phi}$. This case is similar to the case of recording 2 waves treated below.

In FIG. 6, the system is illuminated by two distinct waves I and R supplied by sources S1 and S2 as in FIG. 3.

The aberrator is positioned, for example, in the path of the wave R. The aberrator introduces a local phase $\phi$ into the wave R, that is to say, it transforms it into $R.e^{i\phi}$.

The transparency is illuminated by a plane wave I. We therefore have $O=IT$.

The hologram records $R^*.e^{i\phi}$ IT.

In reading, reilluminated by R, it diffracts a wave $e^{i\phi}$ IT deformed with respect to IT. The image appears scrambled to the observer, as above.

The deformation undergone by the image is the same as that coming from the aberrator.

Under these conditions, in order to be able to reread the images recorded using the systems of FIGS. 5 and 6, it is necessary to correct the aberrations introduced by the aberrator.

For this purpose, according to the invention, an aberration-correcting device 27, which we will call a revealer 27, is placed (FIG. 7) in front of the hologram thus recorded, through which it is possible to read the hologram corrected of the aberrations.

Figure 7:
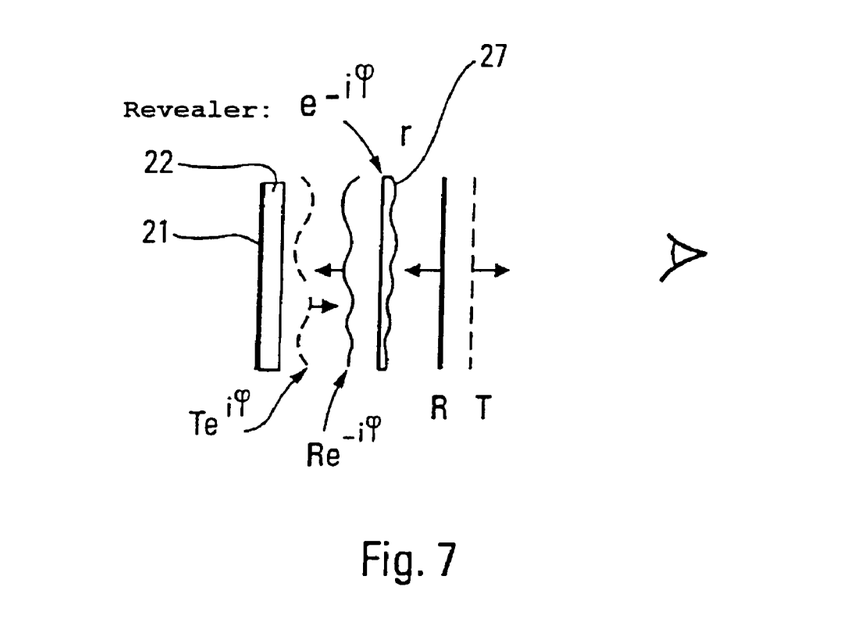
FIGS. 7 and 8, systems making it possible to read a hologram by removing scrambling contained in the holograms.

The revealer induces a phase function the inverse of that of the aberrator, that is $e^{-i\phi}$, on the read wave.

The wave incident on the hologram is $Re^{-i\phi}$. Since the hologram has recorded $R.Re^{2i\phi}T^2$ it diffracts a wave proportional to $T^2.e^{i\phi}$ then passes back through the revealer which again induces $e^{-i\phi}$ and thus the light wave coming from the revealer is proportional to T, that is to say corresponds to the undeformed image.

Therefore, with a recording such as that of FIG. 6, (aberrator on the reference wave side), the aberrator induces $\phi$, the revealer must induce $-\phi$.

Where the aberrator has been positioned on the modulator side, the revealer is determined as in the two-wave case described below.

Figure 8:
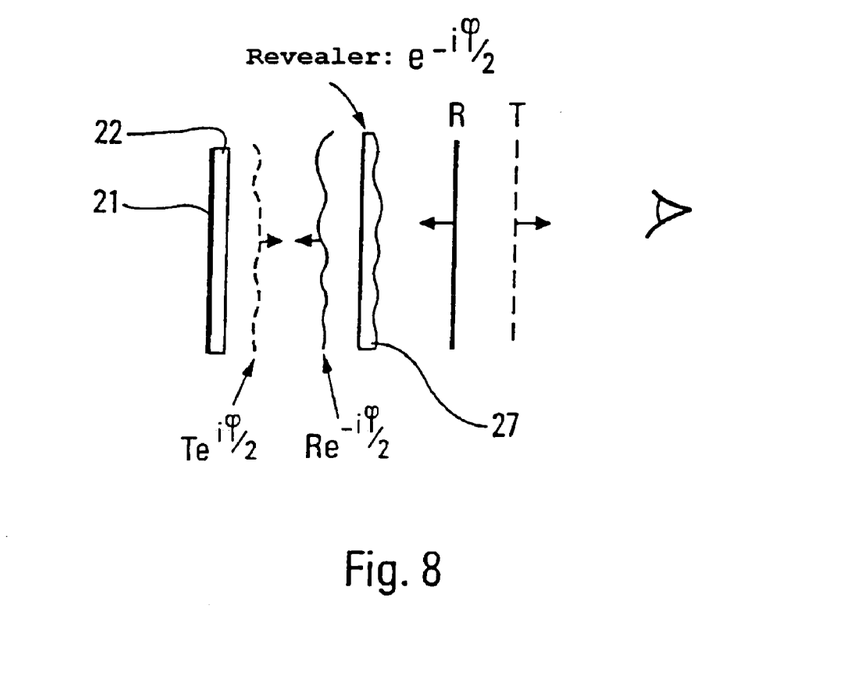

According to FIG. 8, the revealer induces a phase function of $e^{-i\phi/2}$ on the read wave.

The wave incident on the hologram is $R.e^{i\phi/2}$. Since the hologram has recorded $R^*ie^{i\phi}T$, it diffracts a wave proportional to $T.e^{i\phi/2}$ then passes back through the revealer which again induces $e^{-i\phi/2}$ and thus the light wave coming from the revealer is proportional to IT, that is to say it corresponds to the undeformed image.

Therefore with 2 wave recording: the aberrator induces $\phi$ and the revealer must induce $-\phi/2$.

In order that the positioning of the revealer is not too critical, the aberrator must be chosen so as to noticeably modify the view of the image but with phase defect spatial frequencies on the scale of the positioning accuracy tolerated.

1°/ 1 or 2 wave recording can be carried out with any incident waves. The benefit is, inter alia, to separate the direction of observing the recorded image from the specular reflection. This configuration substantially improves the image contrast.

2°/ In FIG. 2, a nonspecular mirror can be used in recording so as to modify the angle of incidence of the object wave with respect to that of the reference wave, namely to separate the direction of observing the photo from the specular reflection.

3°/ The aberrator and the revealer are two different phase functions. It is possible to use the same component for both functions by reilluminating the hologram not with R but with $R^*$. In this case, the phase function recorded in the hologram is transformed into its conjugate by diffraction and self-corrects by passing through this same phase law. This is the principle of phase conjugation.

A hologram of this sort is thus made difficult to counterfeit by the presence of the aberrator during recording:
knowledge of the correct aberration function to be used is not easy to acquire. This analysis can be made difficult by superimposing a scattering function on the diffracted function;
on the assumption that the aberrant function to be used during recording has been determined, the practical construction of a known phase law aberrator is not easy.

Figure 9:
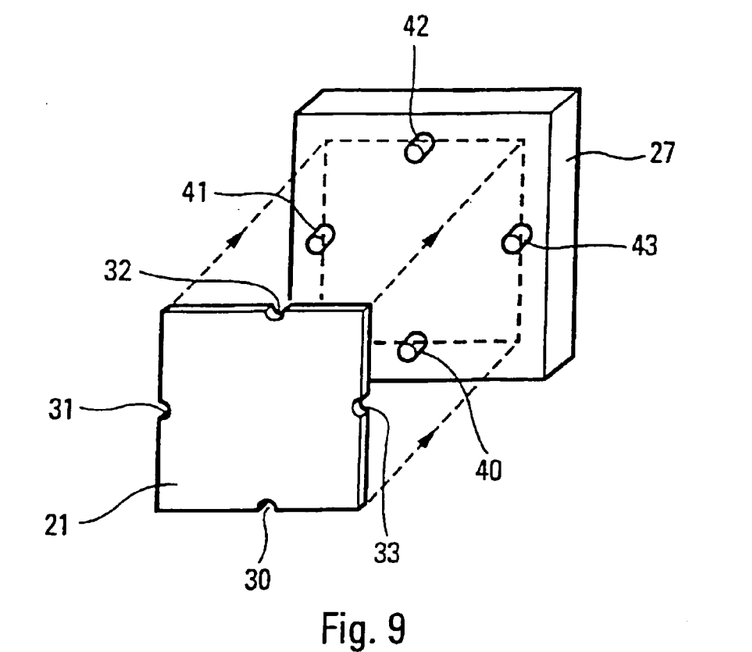
FIGS. 9 and 10, a device for reading a document furnished with a hologram and making it possible to remove scramblings induced in the hologram.

FIG. 9 shows a device for reading a document furnished with a hologram recorded with aberrations. This device comprises a revealer 27 which must be accurately positioned with respect to the hologram in order to allow sufficient correction of the aberrations. According to FIG. 8, the document which bears the hologram or the hologram support comprises positioning means such as notches 30 to 33. The read device comprises lugs or pads 40 to 43, the complement of the notches, so that the document is placed correctly in front of the revealer.

Figure 10:
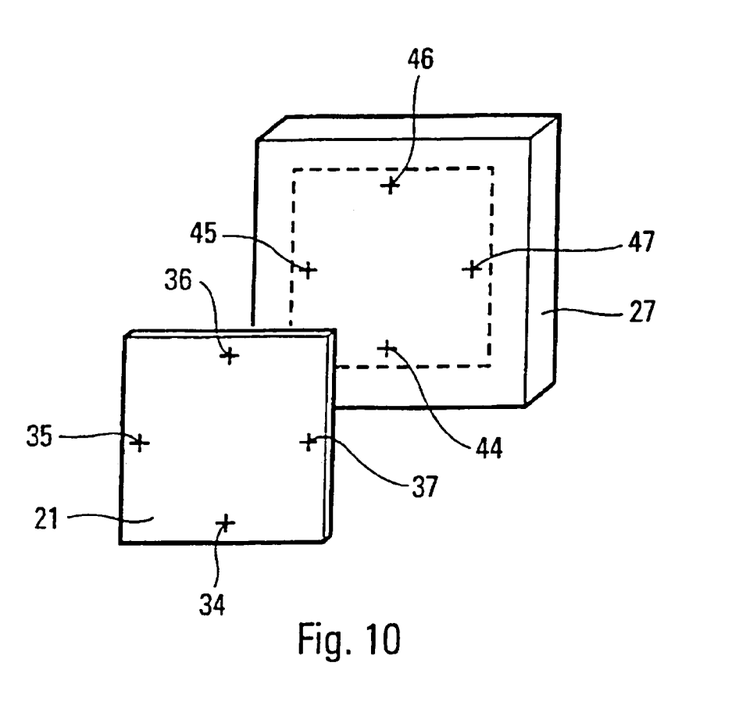

According to a variant embodiment (FIG. 10), instead of notches, the document may comprise optical marks 34 also comprises optical marks 44 to 47. Making the marks 34 to 37 coincide with the marks 44 to 47 enables the hologram to be placed correctly in front of the revealer 27.

To improve the protection against counterfeiting, it is proposed to use a variant of the photosensitive protection of a volume which consists of the superposition of several photosensitive functions, one of which contains the phototype personalized data.

Figure 11:
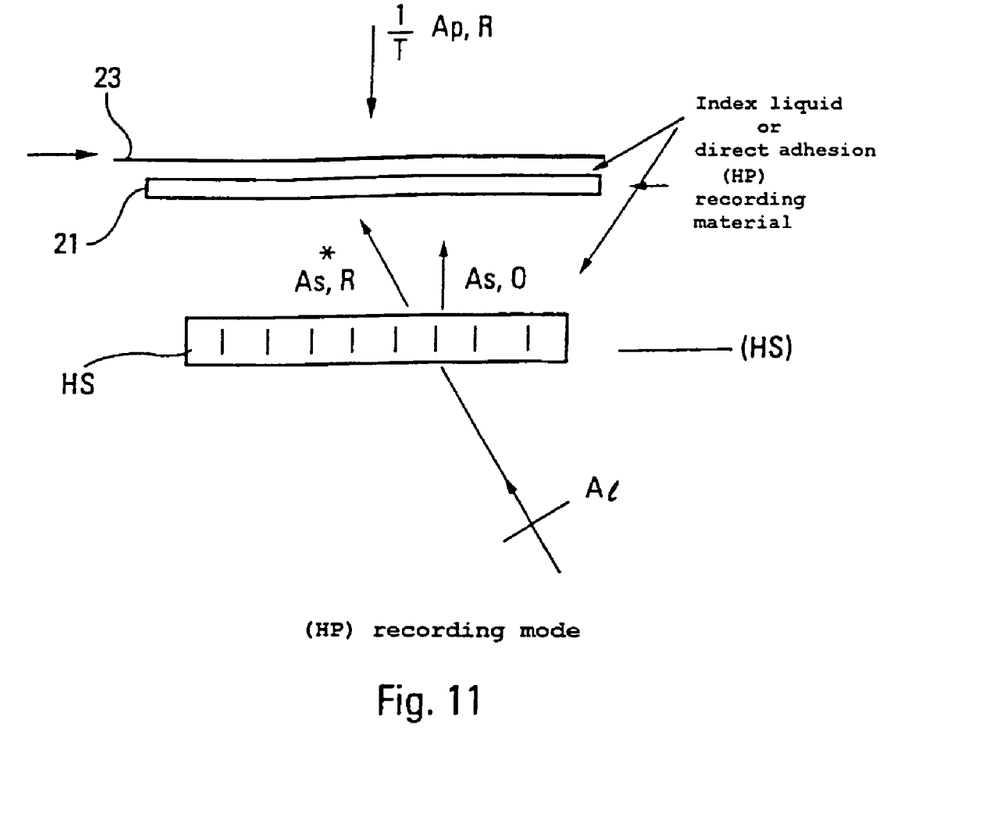
FIGS. 11 and 12, schematic diagrams of documents incorporating special gratings placed against the holograms.

By way of example, the following combination is proposed:
a photo-type hologram (HP) operating in reflection providing the personalization;
a grating-type coding function (HS) operating in transmission providing the security;

In the case which is described in FIG. 11 illustrating this principle, the function (HP) has been recorded in the holographic layer 21 with an object wave obtained with the modulator 23 by means similar to the Lipmann process and with a reference wave which is the sum of the waves transmitted by the component HS. In FIG. 11, the component HS is, for example, a diffraction grating supplying two waves $A^*_{S,R}$ and $A_{S,O}$.

To be visible, the photo contained in the component 21 requires the presence of the coding function of the component HS.

The grating function HS may simply be of the grating type with a fixed pitch or contain specific but not personalized data: it will therefore be identical for all the cards.

The benefit of the HS coding function resides in the fact that it endows the personalized hologram with specific optical properties colorimetry, multiple angular ranges of visibility as a function, for example, of the grating order number, etc.

Figure 12:
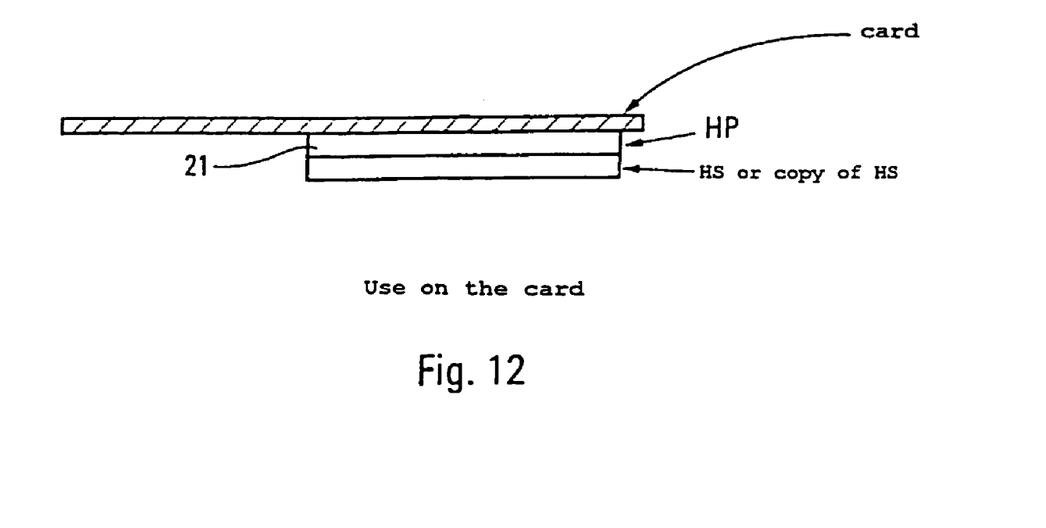

The combination of the two components, photosensitive layer and grating HS (FIG. 12) by "anti-peel" bonding means does not enable the two optical functions to be separated and consequently makes counterfeiting complex insofar as it requires knowledge of the amplitude and phase data of each of the reference and object waves for each of the two components to be recorded. Analysis of the wave diffracted by the assembly gives access to a product of all these complex waves;

if $A_{S.R}$ and $A_{S.O}$ are the reference and object recording waves, respectively, of the grating HS and $A_I$ the wave incident on HS to record the component 21, then the recording waves of the hologram 21 are $[A_{S.R}.A_{S.O}+A^*_{S.R}.A_{S.O}]A_I$ and $A_{P.O}$.

The image recorded in the hologram 21 will be observed without distortion if the whole (21+HS) is illuminated by the wave $A_I$.

Outside these observation conditions, the holographic image will change color with the appearance of distortions or will disappear depending on its geometrical characteristics (thickness and index variation), a simple Lipmann hologram does not show such distortions.

According to a variant of the system of FIG. 11, the safety function may contain data which will be highlighted by the continuous component reflected by the photosensitive component. To increase the visibility of the data reread by the continuous component, it is possible to add, on the rear face of the hologram, a high index treatment or a treatment with narrow spectral reflectivity.

The relative positions of the hologram functions and of the grating HS can be exchanged as well as their kind and type of transmission or reflection.

Where transmission functions are combined, it is possible to add a high index treatment or a narrow spectral band reflector (which may or may not be photosensitive) to increase the readability of the data.

It should be noted that in the above, the photosensitive functions may be monochrome, dichrome or trichrome, etc., it is possible to adjust the colorimetry of the image for authentication with a given light source (natural, neon or other light) or code the data stored in one and the same layer in different colors.

The use of photosensitive material with swelling that can be spatially controlled by post-treatment makes it possible either to color-code a given motif superimposed on the personalized hologram, or to include another high-resolution function which can be seen with an additional source.

In addition, the hologram may be transparent to allow the reading of data located under the hologram, on the document.

The hologram can be read either by natural light, or by normal illumination, or using a lamp with a particular range of wavelengths.

It will generally be recalled that:

if the hologram is thick, it only diffracts the recorded image with light incident at a particular angle (Bragg effect) and that the recorded image is only visible from a viewing angle determined with respect to the direction of the incident light;

the illuminating waves R and O are preferably plane but that is not compulsory;

the illuminating waves R and O may be counterpropagating but that is not compulsory;

the illuminating waves R and O are preferably mutually coherent;

the hologram can be recorded with a single wavelength or by using several wavelengths, or else by using three wavelengths (red, green, blue) so as to diffract white light.

What is claimed is:

1. A document comprising:
   at least one drawing or data produced by deposition or inclusion of pigments or dyes which can be read optically;
   a hologram including a deformed copy of said drawing or said data, wherein said deformed copy includes deformations introduced during recording of the hologram; and
   a photosensitive layer having a coding function configured to remove the deformations from an image of the hologram.

2. The document as claimed in claim 1, wherein the deformations are aberrations.

3. The document as claimed in claim 1, wherein the deformations are scattering effects.

4. The document as claimed in claim 1, wherein said photosensitive layer includes a diffraction grating.

5. The document as claimed in claim 1, wherein said photosensitive layer contains specific but not personalized data, identical for all documents of a same type.

6. The document as claimed in claim 1, wherein the coding function comprises at least one of a colorimetry function with multiple angular ranges of visibility, and a high-resolution function visible with an additional light source.

7. The document as claimed in claim 1, wherein the hologram and the photosensitive layer are bonded together by an anti-peel bonding means.

8. The document as claimed in claim 1, wherein the hologram is transparent so that data located under the hologram, on the document, can be read.

9. The document as claimed in claim 1, wherein the hologram can be read only under lighting of certain wavelengths.

10. The document as claimed in claim 1, wherein the hologram can be read at different wavelengths from different angles.

11. The document as claimed in claim 1, wherein the hologram is combined with a reflector with narrow band reflectivity.

12. The document as claimed in claim 1, wherein the hologram includes at least one other image, such that the at least one other image appears in a plane different to that of said deformed copy in the image of the hologram.

13. The document as claimed in claim 12, wherein said at least one other image can be read at a wavelength different from that of said deformed copy.

14. Document according to claim 1, wherein the hologram comprises data printed on its surface.

15. The document as claimed in claim 1, wherein an image of the at least one drawing or data is not visible in the image of the hologram if the photosensitive layer is removed.

* * * * *